Sept. 15, 1964  E. A. LUEBKE  3,149,253
ELECTRODE STRUCTURE FROM MAGNETOHYDRODYNAMIC DEVICE
Filed Jan. 3, 1962
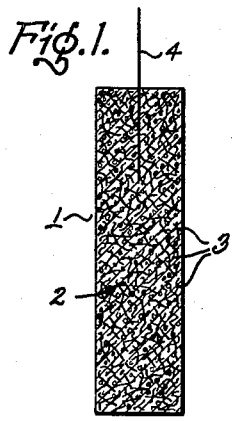
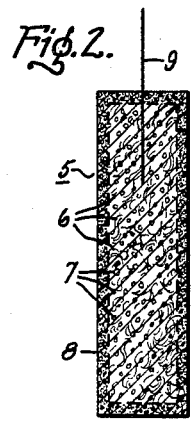
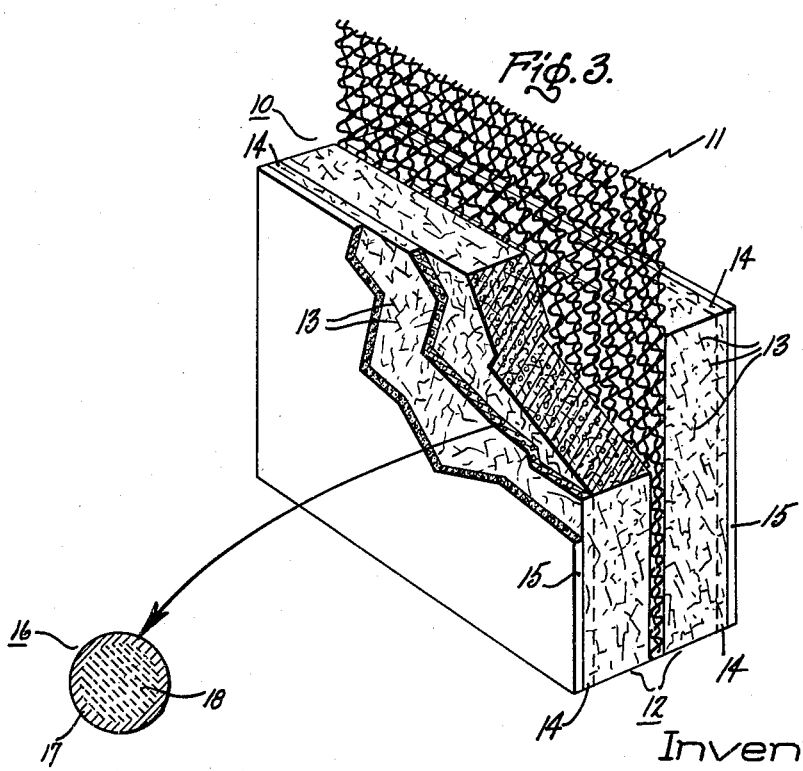
Inventor:
Emmeth A. Luebke,
by Paul A. Frank
His Attorney United States Patent Office 3,149,253
Patented Sept. 15, 1964

3,149,253
ELECTRODE STRUCTURE FROM MAGNETO-
HYDRODYNAMIC DEVICE
Emmeth A. Luebke, Schenectady, N.Y., assignor to General Electric Company, a corporation of New York
Filed Jan. 3, 1962, Ser. No. 164,114
7 Claims. (Cl. 310—11)

This invention relates to apparatus for generating electrical power, and more particularly, to improved electrode structures for an apparatus which generates direct current power by the interaction of a moving conducting fluid in a magnetic field.

Conventional rotating devices for generating electricity are based on the principle of first converting heat energy to rotational mechanical energy, typically in a prime mover, such as a steam turbine, and then converting the mechanical energy to electrical energy by driving a metallic conductor through a magnetic field. For economical operation of such turbine-power generating systems, high thermal efficiencies in the steam turbine are imperative. The various improvements in turbine efficiencies that have been effective in the past have been achieved by operating at ever higher temperatures and pressures. As these rise the problems they generate multiply rapidly so that a limit is quickly reached in what may be accomplished by further increases in operating temperatures and pressures. Probably the greatest difficulty arises in the materials area, since the mechanical stresses on moving parts such as turbine blades, shafts, etc., become progressively more severe in the air as operating temperatures and pressures are increased. Consequently, a "diminishing returns" effect has set in and improvements in efficiency have been achieved in smaller increments at higher and higher costs. Many of these difficulties can be avoided and radical improvements in conversion efficiencies can be effected by quickly eliminating those elements which limit performance and devising a system which does not have any movable mechanical components. To this end it has been proposed to generate electricity by abstracting energy from a moving conducting field, preferably a gaseous one, as it passes through a magnetic field. By using a fluid conductor in the place of a solid one, the conductor may be driven to the magnetic field without employing rotating moving parts merely by impressing a pressure difference on the fluid. The mechanical prime movers, such as turbines, are, therefore, no longer necessary and a generating system without any moving parts is feasible. The body of scientific knowledge dealing with the interaction of a conducting gaseous fluid with a magnetic field is commonly known as magnetohydrodynamics (usually abbreviated to MHD) and all subsequent references in this specification to the generation of electrical power by the interaction of a conducting fluid in a magnetic field will be to magnetohydrodynamic generation or MHD generation.

Typical systems for MHD power generation as conceived by previous workers in the field is described in detail in patent application Serial No. 114,434, entitled, "Electrode Structure from Magnetohydrodynamic Device," by Henry Hurwitz, Jr., and George W. Sutton, filed June 2, 1961, and assigned to the assignee of the present invention. The Hurwitz et al. invention contemplates bringing a gas stream to a conducting condition by heating it to a temperature at which the gas becomes partially ionized. The ionized gas stream is driven through a magnetic field by a pressure difference causing an electromotive force (E.M.F.) to be generated in the gas. Under the influence of this E.M.F., such charged particles as are present in the gas are deflected to electrodes causing a unidirectional or direct current to flow through an external load circuit connected to the electrodes.

Conventional MHD generating systems are characterized by difficult maintenance problems because of the rugged environment to which the construction materials are exposed. The electrodes and the confining walls for the conducting gaseous medium are exposed to temperatures of several thousand degrees Kelvin which are necessary to obtain the required ionization of the gas. A known method for substantially lowering the critical threshold temperature for ionization of the gaseous medium adds a small amount in the range of 0.01–1% by volume of some easily ionizable material to the gas thereby reducing ionization threshold temperatures from about 3500° K. to around 2000° K. While the seeding of the gaseous medium eases the thermal stability characteristics of the construction materials, unfortunately, it contributes to an already serious corrosion problem because the seeding agents are extremely corrosive at the operating temperatures. A still further problem associated with current generation in an ordinary MHD device is the concentration of current at one edge of the electrodes. This, of course, causes "hot spot" which tends to destroy the electrode quickly and thereby interrupt operation of the device.

Conventional MHD electrodes are constructed from refractory metals such as tungsten and molybdenum, which are good electrical conductors. Refractory metal electrodes are particularly susceptible to destruction by corrosion and/or oxidation often failing within seconds after operation in the MHD device. The substitution of graphite electrodes for the refractory metal electrodes produces no better results. Obviously, such limitations seriously impede the utility of the MHD device which in most stationary applications must have operational lifetimes at least in the order of months. Certain ceramic electrode structures are known having greater resistance to corrosion and oxidation than refractory metal electrodes. For example, the welding electrode structures of J. D. Cobine disclosed in U.S. Patents 2,540,811; 2,586,516; and 2,640,135; all of which patents are assigned to the assignee of the present invention, withstand temperatures of a welding arc in contact with the tip of the electrode for considerable periods. The electrodes comprise a sintered admixture of tungsten with either zirconia or thoria which may also contain minor amounts of a refractory metal binder including tantalum, vanadium, and niobium. While such electrodes have demonstrated excellent corrosion resistance in the intended application, the structures are not particularly adapted to the use as an electrode in an MHD device. Simple sintered structures of powdered refractory materials are quickly eroded by the rapidly moving ionized gas stream in the operation of an MHD device as evidenced by the numberous erosion failures of graphite electrodes as distinct from corrosion failures. Additionally, the electrical losses of a sintered electrode prepared from powdered refractory materials containing non-conducting metal oxides will be greater than desired for MHD power generation if there is sufficient metal oxide content in the composition to effectively protect the refractory metal constituent from ambient corrosive and erosive conditions.

It is the primary object of the invention, therefore, to provide an electrode structure which is especially adapted for use in an MHD device.

It is another important object of the invention to provide a ceramic electrode structure which does not substantially impede the flow of electrical current in the electrode.

It is still another important object of the invention to provide a refractory electrode by compacting or sintering a mass of powdered refractory materials containing certain additives to produce a structure having improved mechanical and electrical properties at ordinary temperatures as well as at extremely elevated temperatures.

These and other objects and advantages of the invention will be more apparent from the following description.

Briefly, the electrode structures of the invention comprise a unitary mass of particulate refractory particles having an electrically conducting network of refractory metal filaments dispersed throughout the mass to provide a conducting member having novel structural and chemical durability as well as temperature stability. The particular refractory materials useful in particulate form for the electrode structure include at least one thermally stable thermionic emitting inorganic metal compound to serve as the matrix of the structure, or alternately, as a discontinuous phase in the structure.

In one preferred embodiment of the invention a refractory metal wool is embedded with a sufficient quantity of refractory particles containing a thermionic emitting compound so as to envelop most of the wool matrix and the composite assembly is hot-pressed by conventional procedures to provide a unitary self-supporting structure having the necessary endurance characteristics for MHD electrode applications. If only minor amounts of the thermionic emitting compound are contained in the structure, the electrode is particularly suited for the anode member in the MHD device having as a primary function the collection rather than the supply of electrons needed for proper operation of the device.

In still another preferred embodiment of the invention, a durable electrode may be prepared which is particularly suited for the cathode member in the MHD device by compacting or sintering a mixture of the refractory particles containing a substantial proportion of the thermionic emitting compound and also a sufficient quantity of discontinuous refractory metal filaments to provide a conducting network in the final electrode. A still different cathode structure may be provided from a simple admixture of refractory thermionic emitting inorganic particles with refractory metal filaments. As will be apparent from the further description contained hereinafter in this specification, a great variety of suitable electrodes for MHD applications may be provided according to the principles of the invention.

The invention may be better understood by reference to the following description taken in conjunction with the accompanying drawings, in which:

FIGURE 1 is a cross-sectional view of a preferred electrode structure of the invention;

FIGURE 2 is a cross-sectional view of still a different type electrode structure of the invention;

FIGURE 3 is a perspective view, partially in cross section, of still a different preferred electrode of the invention.

In FIGURE 1 there is shown an electrode structure 1 which comprises a bonded mass 2 of a particulate thermionic emitting inorganic metal compound containing a conducting network 3 of refractory metal filaments dispersed throughout the mass of particles. A simple admixture of the refractory particles and metal filaments can be employed for direct preparation of a satisfactory electrode structure by conventional compaction and/or sintering technique and a suitable admixture for the electrode structure may comprise proportions of the constituents in the range 20–25% refractory particles by volume of the mixture with 80–95% refractory metal filaments by volume of the mixture. For the common refractory materials, these proportions provide a final electrode structure having endurance at the extremely elevated operating temperatures of MHD power generation and do not impede current flow by unduly high electrical resistance. It will be realized that the optimum proportions of the constituents in any particular admixture to provide these results depends primarily upon the characteristics of the specific materials employed. For this reason, it is advisable to prepare various electrodes from admixtures with different proportions of any given combination of the materials and to test the operating characteristics of these electrodes in order to determine the optimum composition of the electrode within the above composition range. The admixtures may be prepared conveniently by gentle blending of the filaments with the refractory particles to avoid substantial comminution of the metal filaments. Methods of mixing solids by mechanical means without grinding or otherwise fracturing the treated material are well known so that it is unnecessary to further described such methods in the specification.

While the method of preparing suitable admixtures for the electrode structure is not critical to the successful practice of the invention, preparation of the final electrode structure must be accomplished by means which provide a refractory bond between the individual constituents of the admixture. More particularly, a stable bond must be established between both the individual refractory particles and the refractory metal filaments of a nature which is not disrupted during subsequent service of the electrode. Suitable bonding of the admixture may be obtained by the usual metallurgical techniques employed for preparation of a cermet body wherein the admixture is treated at elevated temperatures and pressures sufficient to form liquid cementing products which wet the individual constituents in the admixture and adhere them together. To further illustrate preparation of a suitable final electrode structure, an admixture comprising 80 parts by volume of short tungsten filaments with 20 parts by volume powdered thorium dioxide was put into a graphite mold and heated by conventional induction heating device to temperatures of about 1500° C. being subjected to pressures of approximately 2500 p.s.i. at the elevated temperature. The product comprised a hard dense mass of firmly bonded particles having excellent mechanical and electrical properties at ordinary conditions as well as durability in MHD service. Connecting lead 4 is attached to the electrode in an ordinary manner by such means as embedding a conducting wire in the structure during preparation or by cementing the wire to the final electrode structure with a suitable adhesive composition.

In FIGURE 2 there is shown a different electrode structure 5 which comprises refractory metal wool 6 having embedded therein an adhered mass of inert refractory paritcles 7 over which is deposited a surface layer comprising a bonded mixture of the inert refractory particles with a sufficient quantity of a thermionic emitting inorganic metal compound in particulate form to supply electrons at the elevated temperatures of MHD power generation. It will be noted that the metal wool extends into the exterior surface layer so as to render the entire electrode structure electrically conducting. By reason of the support provided in the intertwined metal filaments of the refractory metal wool, a structurally sound electrode is provided by simply heating the assembled wool and refractory particles without any necessity for compacting the heated mass at the extremely elevated pressures beforementioned. For example, a piece of refractory wool having roughly the desired shape of the final electrode is impregnated with inert refractory particles utilizing only the pressure needed to compact the mas of particles into a self-supporting structure not having large voids and the compacted assembly heated to elevated temperatures for bond formation. The compact is a hard, firmly bonded structure having wool filaments exposed on the surface of the structure. A thermionic emitting surface layer 8 is next hot-pressed onto the base structure to provide the final electrode. The surface layer is prepared from an admixture comprising the inert refractory particles with particles of a thermionic emitting inorganic metal compound and is of sufficient thickness to cover the protruding metal filaments thereby protecting these elements against corrosion and erosion in MHD service. While the outer surface layer of the electrode may consist entirely of a bonded mass of the particulate thermionic emitting material alone, admixtures containing a substantial proportion of the substrate material are preferred by reason of lesser differences in thermal expansion between the individual layers which promotes greater thermal shock resistance in the final electrode. An electrical lead 9 is attached to the electrode for connection to an external load in the usual fashion.

In FIGURE 3 there is shown a different preferred electrode structure 10 having a centralized refractory metal grid core for improved structural strength and electrical conduction in the electrode. Other grid structures can be substituted for this purpose in place of the screen element 11 depicted in the drawing including refractory porous conducting nonmetals such as carbon felt, perforated carbide, or boride elements, and the like. The structure of the electrode comprises an innermost layer 12 bonded to the core member and which comprises a particulate inert inorganic metal compound containing refractory metal filaments 13 dispersed throughout the mass of particles, a surface adjacent layer 14 of the particles having an exterior surface of the metallic element of the inorganic compound, and an outermost surface layer 15 integrally bonded to the metallic surfaces of layer 14 and consisting of an adhered mass of a different inorganic compound of the same metal element common to the substrate layers. Certain advantages are gained by employing different materials in the individual layers and bonding these layers together through the agency of a common cementing metal. By this procedure, it is possible to select particular compounds which undergo only slight reaction with the material of the grid member while also employing a more efficient thermionic emitting material in the outermost surface layer. More particularly, a great many metal oxides are far more compatible with the common refractory metals for the grid element than are the more efficient metal carbide and metal boride thermionic emitters at the service temperatures intended for the electrodes. Consequently, it will generally be more desirable for durability of the electrode to employ metal oxides in the innermost substrate layer and more efficient metal carbide or metal boride emitters in the outermost surface layer.

Fabrication of the electrode structure in the embodiment may be accomplished by initially bonding a layer of the particulate oxide material admixed with sufficient refractory metal filaments to provide a conducting network throughout the layer to the core member by such means as described for the preparation of the electrode structure in FIGURE 1. Thereafter, a surface adjacent layer of particles having a metallic surface may be obtained by preferential chemical reduction of the material. The preferential chemical reduction may be effected by carbonizing the surface at extremely elevated temperatures for short periods in the order of one or two minutes which causes the carbon to reduce some of the oxide to the metallic state. For clarity of illustration, a several hundred times enlargement of the reduced particle 16 having a surface metal film 17 overlying the oxide core is depicted in FIGURE 3. An outermost surface layer of a carbide or boride compound of the metal in particulate form is bonded to the metallic substrate by such means as heating a powdered mixture of the material to sufficiently elevated temperatures to effect sintering. While the embodiment of FIGURE 3 is depicted with certain of the metal filaments extending throughout the structure, the practice is optional with respect to a carbide or boride surface layer since these materials exhibit good electrical conductivity at the service temperatures.

The refractory thermionic emitting inorganic metal compounds useful in the electrode structure may be best characterized by their primary function in the composition which is to supply electrons at the service temperatures. Consequently, these materials will have a low thermionic "work function" for the efficient emission of electrons at elevated temperature. The work function being referred to is well known as the "Richardson work function" and the emitter materials of the invention have work functions below 4.0 electron volts. The significance of a low work function is realized when it is considered that the saturation emission at 2200° K. for an emitter with a work function of 3 electron volts is approximately three orders of magnitude greater than the emission from the conventional refractory metals employed for electrodes heretofore, molybdenum and tungsten having work functions of 4.2 electron volts and 4.5 electron volts, respectively. Satisfactory materials having the desired characteristics can be selected from the broad class of solid inorganic compounds which do not melt or evaporate substantially of the operating temperatures, including oxides, such as barium oxide, strontium oxide, calcium oxide, thorium oxide, beryllium oxide, aluminum oxide, lanthamum oxide, and magnesium oxide; metal carbides such as tantalum carbide, titanium carbide, tungsten carbide, thorium carbide, niobium carbide, and molybdenum carbide; and metal borides such as calcium boride, strontium boride, lanthamum boride, cerium boride, thorium boride, and barium boride, and the like. The size of the individual refractory particles for preparation of a suitable electrode according to the invention is well known in the ceramic and powder metallurgy art and may vary from finely divided powdery flours to coarse grains of the material with a particle size of 100 mesh U.S. screen size and larger. A table listing particularly suitable emitters with corresponding melting points and work functions is listed below for purposes of greater illustration.

*Table*

| Material | M.P.,° C. | φ |
| --- | --- | --- |
| BaO | 1,936 | 1.53 |
| SrO | 2,430 | 1.4 |
| CaO | 2,580 | 1.9 |
| ThO$_2$ | 3,050 | 2.55 |
| La$_2$O$_3$ | 2,315 | 2.0 |
| TaC | 3,880 | 3.14 |
| TiC | 3,114 | 2.35 |
| TaB | 3,000 | 2.89 |
| CaB$_6$ | 2,235 | 2.86 |
| SrB$_6$ | 2,235 | 2.67 |
| LaB$_6$ | 2,210 | 2.66 |
| CeB$_6$ | 2,190 | 2.59 |
| ThB$_6$ | 2,195 | 2.92 |
| BaB$_6$ | 2,270 | 3.45 |
| W$_2$C | 2,860 | 3.85 |
| WC | 2,870 | 2.59 |
| MoC | 2,692 | 3.17 |
| ThC | 2,773 | 2.92 |
| NbC | 3,900 | 2.73 |

The refractory metal filaments useful in the electrode structures of the invention can be selected from the class of conducting metals which remain solid at the use temperatures and do not evaporate excessively, useful metals including tungsten, molybdenum, and tantalum. Small proportions of still other refractory or "cementing" metals may optionally be used in the electrode mixtures to further increase the bond strength between the major constituents, especially if the method selected for fabricating the electrode structure does not involve high pressures in conjunction with elevated temperatures. The metal filaments in the structure provide mechanical reinforcement while also preventing thermal shock degradation due to spalling, cracking, and crazing. More particularly, the higher thermal expansion of the metal filaments compared to the refractory materials permits a prestress to be imparted to the structure during preparation which is advantageous in subsequent use of the electrode. A prestressed electrode will have greater strength when exposed rapidly to the elevated temperatures of operation than an unstressed electrode. The prestressed condition is provided during the cooling cycle of electrode preparation wherein the refractory metal filaments having the higher thermal expansion tend to contract more than the refractory particles with the result that the filaments are placed under tension while the adherent particles become stressed compressively. When the prestressed structure is thereafter heated during operation of the electrode the opposite result occurs so that the refractory portion of the structure which is most subject to failure in tension must first undergo a relaxation cycle to relieve the compressive stresses before entering the tension cycle.

The inert metal oxides useful in the preferred electrode compositions are chemically and thermally stable inorganic compounds which undergo a minimum of chemical reaction with the refractory metal filaments at elevated temperatures. Stable oxides include aluminum oxide, magnesium oxide, beryllium oxide, and zirconium oxide, which are far less reactive with the filaments than many of the emitter materials listed in the above table, thereby preserving integrity of the filaments in the electrode structure. For example, certain of the borides and carbides listed in the table would attack the refractory metals at the operating temperatures forming metal boride and carbide products having a higher electrical resistance than the metals. It is not possible to further distinguish the inert oxides from other thermionic emitter materials on the basis of emission characteristics since certain of the inert metal oxides are as efficient emitters as any material listed in the table on the basis of thermionic work function which for magnesium oxide is 2.85 and for beryllium oxide is 3.3. Consequently, many of the refractory metal oxides may be used advantageously for the electrode compositions in association with more chemically active emitter materials or, alternatively, as the primary emitter materal in the composition.

It will be apparent from the above description that a novel electrode having a conducting network of metallic filaments throughout the electrode structure has been disclosed which is particularly adapted for use in a MHD device. It is not intended to limit the invention to the embodiments above shown since it will be obvious to those skilled in the art that modifications of the present teaching may be made without departing from the true spirit and scope of the invention. It is intended to limit the invention, therefore, only to the scope of the following claims.

What I claim as new and desire to secure by Letters Patent of the United States is:

1. An electrode for a magnetohydrodynamic device which comprises a bonded mass of refractory thermionic emitting particles having a conducting network of refractory metal filaments dispersed throughout the mass.

2. An electrode for a magnetohydrodynamic device which comprises a bonded mixture of refractory thermionic emitting particles having a conducting network of refractory metal filaments dispersed throughout the bonded admixture, the admixture containing at least one inert metal oxide.

3. An electrode for a magnetohydrodynamic device which comprises a bonded mass of refractory thermionic emitting particles having a central portion comprising an inert metal oxide and an outer portion comprising an admixture containing the inert metal oxide, and a conducting network of refractory metal filaments dispersed throughout the bonded mass.

4. An electrode for a magnetohydrodynamic device which comprises a bonded mass of refractory inert metal oxide particles with the surface adjacent particles having an exterior surface layer of the metal, a conducting network of refractory metal filaments dispersed throughout the bonded mass and an outermost surface layer comprising an admixture of the metal oxide particles with electrically conducting particles of a refractory thermionic emitting inorganic compound of the metal directly bonded to the metal surface of the substrate particles.

5. An electrode for a magnetohydrodynamic device which comprises a compact of a porous electrically conducting refractory core and a bonded mass of refractory thermionic emitting particles having a conducting network of refractory metal filaments dispersed throughout the bonded mass.

6. An electrode for a magnetohydrodynamic device which comprises a compact of a porous electrically conducting refractory core and a bonded admixture of refractory thermionic emitting particles having a conducting network of refractory metal filaments dispersed throughout the bonded admixture, the admixture containing at least one inert metal oxide.

7. An electrode for a magnetohydrodynamic device which comprises a compact of a porous electrically conducting refractory core and a bonded mass of inert refractory thermionic emitting particles having a central portion comprising an inert metal oxide and an outer portion comprising an admixture containing the inert metal oxide, and a conducting network of refractory metal filaments dispersed throughout the bonded mass.

References Cited in the file of this patent

UNITED STATES PATENTS

| | | |
|---|---|---|
| 2,501,089 | Pomerantz | Mar. 21, 1950 |
| 2,540,811 | Cobine | Feb. 6, 1951 |
| 2,586,516 | Cobine | Feb. 19, 1952 |
| 2,640,135 | Cobine | May 26, 1953 |
| 2,888,592 | Lafferty | May 26, 1959 |